(12) United States Patent
Chelin et al.

(10) Patent No.: US 12,535,042 B2
(45) Date of Patent: Jan. 27, 2026

(54) AIRCRAFT NACELLE EQUIPPED WITH AT LEAST ONE THRUST REVERSAL DEVICE COMPRISING AT LEAST ONE LONGITUDINAL DEFLECTOR, AIRCRAFT COMPRISING AT LEAST ONE PROPULSION UNIT HAVING SUCH A NACELLE

(71) Applicant: Airbus Operations SAS, Toulouse (FR)

(72) Inventors: Frédéric Chelin, Toulouse (FR); Christophe Bourdeau, Toulouse (FR); Olivier Scholz, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/644,812

(22) Filed: Apr. 24, 2024

(65) Prior Publication Data

US 2024/0360802 A1    Oct. 31, 2024

(30) Foreign Application Priority Data

Apr. 26, 2023 (FR) ...................................... 2304193

(51) Int. Cl.
   *F02K 1/76*   (2006.01)
   *F02K 1/70*   (2006.01)
   *F02K 1/72*   (2006.01)

(52) U.S. Cl.
   CPC ............... *F02K 1/766* (2013.01); *F02K 1/70* (2013.01); *F02K 1/72* (2013.01)

(58) Field of Classification Search
   CPC ..... F02K 1/64; F02K 1/70; F02K 1/72; F02K 1/766; F05D 2220/323; F05D 2240/129
   See application file for complete search history.

(56) References Cited

U.S. PATENT DOCUMENTS

| | | | | |
|---|---|---|---|---|
| 3,794,246 A | * | 2/1974 | Weise | ....................... F02K 1/56 239/265.33 |
| 4,278,220 A | * | 7/1981 | Johnston | ................... F02K 1/72 244/110 B |
| 4,852,805 A | | 8/1989 | Vermilye | |
| 2006/0005530 A1 | | 1/2006 | Blin et al. | |
| 2016/0047333 A1 | * | 2/2016 | Starovic | ................... F02K 1/70 239/265.19 |

(Continued)

OTHER PUBLICATIONS

French Search Report for corresponding French Patent Application No. 2304193 dated Nov. 29, 2023.

*Primary Examiner* — Devon C Kramer
*Assistant Examiner* — Henry Ng
(74) *Attorney, Agent, or Firm* — Greer, Burns & Crain, Ltd.

(57) ABSTRACT

An aircraft nacelle equipped with a thrust reversal device which comprises: at least one deflection system configured to deflect an air stream channeled in the nacelle toward a lateral opening of the nacelle, in the activated state, at least one orientation system having: at least one transverse deflector configured to orient the air stream deflected by the deflection system in radial directions and toward the upstream end of the nacelle, at least one longitudinal deflector configured to orient the air stream deflected by the deflection system in at least one direction that forms an angle with a radial direction.

8 Claims, 6 Drawing Sheets

(56) References Cited

U.S. PATENT DOCUMENTS

| | | | |
|---|---|---|---|
| 2016/0201601 A1* | 7/2016 | Nakhjavani | F02K 1/72 |
| | | | 239/265.19 |
| 2016/0201602 A1* | 7/2016 | Nakhjavani | F02K 1/763 |
| | | | 239/265.19 |
| 2016/0245228 A1* | 8/2016 | Gormley | F02K 1/72 |
| 2017/0292473 A1* | 10/2017 | Stretton | F02K 1/763 |
| 2018/0179989 A1* | 6/2018 | Wadsworth | F02K 1/72 |
| 2018/0340492 A1 | 11/2018 | Harpal et al. | |
| 2019/0375136 A1 | 12/2019 | Chuck et al. | |
| 2020/0200124 A1 | 6/2020 | Chilukuri | |
| 2021/0285382 A1* | 9/2021 | Gonidec | B64D 31/02 |
| 2022/0220923 A1* | 7/2022 | Jodet | F02C 7/24 |
| 2022/0243681 A1* | 8/2022 | West | F02K 1/72 |
| 2022/0325679 A1* | 10/2022 | Chilukuri | F02K 1/625 |
| 2023/0265811 A1* | 8/2023 | Loretz | F02K 1/605 |
| | | | 244/110 B |
| 2023/0313754 A1* | 10/2023 | Wood | F02K 1/766 |
| | | | 60/226.2 |
| 2023/0340928 A1* | 10/2023 | Davis | F02K 1/72 |
| 2024/0060458 A1* | 2/2024 | Ertas | F02K 1/72 |

* cited by examiner

AIRCRAFT NACELLE EQUIPPED WITH AT LEAST ONE THRUST REVERSAL DEVICE COMPRISING AT LEAST ONE LONGITUDINAL DEFLECTOR, AIRCRAFT COMPRISING AT LEAST ONE PROPULSION UNIT HAVING SUCH A NACELLE

CROSS-REFERENCES TO RELATED APPLICATIONS

This application claims the benefit of French Patent Application Number 2304193 filed on Apr. 26, 2023, the entire disclosure of which is incorporated herein by way of reference.

FIELD OF THE INVENTION

The present application relates to an aircraft nacelle equipped with at least one thrust reversal device comprising at least one longitudinal deflector and to an aircraft comprising at least one aircraft propulsion unit having such a nacelle.

BACKGROUND OF THE INVENTION

According to one embodiment, shown in FIGS. 1 to 3, an aircraft 10 comprises multiple propulsion units 12 positioned beneath each one of the wings 14 of the aircraft 10 and connected to the latter by pylons 16. Each propulsion unit 12 comprises a motor 18 positioned inside a nacelle 20. The motor 18 comprises a fan which has an axis of rotation A18.

For the remainder of the description, a longitudinal direction is parallel to the axis of rotation A18. A longitudinal plane is a plane containing the axis of rotation A18 and a transverse plane is a plane perpendicular to the axis of rotation A18. The concepts of front/upstream and rear/downstream refer to the direction of flow of an air stream in the nacelle 20, this stream flowing from the front (from upstream) to the rear (downstream).

The nacelle 20 has an approximately tubular shape and, with the motor 18, delimits an annular duct 22 in which a secondary air stream flows. The nacelle 20 comprises an upstream section 24, which is referred to as the air intake, a median section 26, in which the fan of the motor 18 is positioned, and a downstream section 28, which has a trailing edge 30. At the outer surface of its fuselage, the aircraft 10 comprises at least one sensor 32, such as an airspeed sensor for example.

The nacelle 20 comprises a thrust reversal device 34 positioned in the downstream section 28 and configured to occupy an activated state in which it deflects, outward and upstream of the nacelle 20, at least some of the secondary air stream circulating in the annular duct 22, and an inactivated state in which it does not deflect the secondary air stream circulating in the annular duct 22.

The thrust reversal device 34 comprises at least one movable part 36 for creating at least one lateral opening 38 (shown in FIG. 2) passing through the nacelle 20.

The thrust reversal device 34 comprises a deflection system 40 configured to occupy a retracted position, when the thrust reversal device 34 is in the inactivated state, in which the deflection system 40 does not interfere with the secondary air stream, and a deployed position (shown in FIG. 3), when the thrust reversal device 34 is in the activated state, in which the deflection system 40 interferes with the secondary air stream and orients it toward the lateral opening 38.

The thrust reversal device 34 also comprises an orientation system 42 configured to orient the air stream deflected by the deflection system 40. According to one embodiment, the orientation system 42 comprises multiple cascades of vanes 44, 46, 48 positioned at each lateral opening 38, which each have first walls positioned in approximately longitudinal planes and second walls positioned in approximately transverse planes. The second walls take the form of a vane to deflect upstream the air stream leaving via each lateral opening 38.

In an arrangement shown in FIG. 3, the orientation system 42 comprises, in line with an opening 38 positioned downstream of a sensor 32, first and second cascades of vanes 44, 46 positioned on either side of a longitudinal plane PL and third cascades of vanes 48 positioned on either side of the first and second cascades of vanes 44, 46.

As illustrated in FIGS. 3 and 4, each third cascade of vanes 48 is configured to orient the air stream 48.1 passing through it in a radial direction and toward the upstream end of the nacelle 20. The first cascade of vanes 44, positioned above the plane PL, is configured to orient the air stream 44.1 passing through it toward the upstream end of the nacelle 20 and upward with respect to a radial direction. The second cascade of vanes 46, positioned below the plane PL, is configured to orient the air stream 46.1 passing through it toward the upstream end of the nacelle 20 and downward with respect to a radial direction. As illustrated in FIG. 4, the first and second cascades of vanes 44, 46 make it possible to move the air stream leaving the thrust reversal device 34 away so that it does not impact the zone at which the sensor 32 is installed and the operation of the sensor is not disrupted.

This embodiment is not satisfactory because the cascades of vanes 44, 46, 48 have a not-inconsiderable mass.

SUMMARY OF THE INVENTION

The present invention aims to overcome all or some of the aforementioned drawbacks.

To this end, the invention relates to an aircraft nacelle having an outer surface extending between upstream and downstream ends and configured to channel an air stream flowing in a longitudinal direction from the upstream end to the downstream end, the nacelle having at least one thrust reversal device which comprises:

- at least one lateral opening which is remote from the upstream and downstream ends, passes through the nacelle and is delimited by upper and lower edges,
- at least one movable part configured to occupy a first position, corresponding to an inactivated state of the thrust reversal device, in which the movable part shuts off the lateral opening, and a second position, corresponding to an activated state of the thrust reversal device, in which the movable part at least partially clears the lateral opening,
- at least one deflection system configured to occupy a retracted position, when the thrust reversal device is in the inactivated state, in which the deflection system does not interfere with the air stream channeled by the nacelle, and a deployed position, when the thrust reversal device is in the activated state, in which the deflection system interferes with the air stream channeled by the nacelle and orients it in radial directions toward the lateral opening, at least one orientation system configured to orient the air stream deflected by the deflection system.

According to the invention, the orientation system comprises:

- at least one transverse deflector positioned approximately in a plane perpendicular to the longitudinal direction, having a first end connected to the upper edge of the lateral opening and a second end connected to the lower edge of the lateral opening and configured to orient the air stream deflected by the deflection system in the radial directions and toward the upstream end of the nacelle,
- at least one longitudinal deflector positioned approximately in a plane parallel to the longitudinal direction and configured to orient the air stream deflected by the deflection system in at least one direction that forms an angle with a radial direction.

According to the invention, each transverse deflector has a large dimension and extends over the entire height of the opening, thereby making it possible to reduce the mass of the orientation system. Each longitudinal deflector makes it possible to orient the air stream deflected by the deflection system such that it does not impact a zone of the outer surface of the nacelle where at least one sensor is positioned. As a result, the operation of the sensor is not disrupted by the thrust reversal device.

According to another feature, each longitudinal deflector intersects each transverse deflector.

According to another feature, the orientation system comprises a main longitudinal deflector which has a T-shaped or V-shaped cross section and extends between first and second ends, the main longitudinal deflector being substantially symmetrical with respect to a longitudinal plane of symmetry.

According to one embodiment, the main longitudinal deflector has a T-shaped cross section and comprises a foot positioned in the plane of symmetry and a head positioned in a plane perpendicular to the plane of symmetry, the foot being closer to the deflection system than the head is.

According to another feature, the head takes the form of a plate which has two lateral edges that are substantially symmetrical with respect to the plane of symmetry.

According to another feature, the main longitudinal deflector comprises an upstream part, which extends from the first end, at which the lateral edges form between them an angle which widens from the first end to the second end, and a downstream part, which extends from the upstream part to the second end, at which the lateral edges are parallel.

According to another feature, the foot has a longitudinal edge which is remote from and substantially parallel to the head, and two lateral faces connecting the longitudinal edge and the head, each lateral face having a concave curvature in planes perpendicular to the longitudinal direction.

According to another feature, the main longitudinal deflector comprises an upstream part, which extends from the first end, at which each lateral face is set apart from the plane of symmetry by a distance which increases from the first end toward the second end, and a downstream part, which extends from the upstream part to the second end, at which each lateral face is set apart from the plane of symmetry by a constant distance.

According to another embodiment, the main longitudinal deflector has a V-shaped cross section and comprises two wings which are substantially symmetrical with respect to the plane of symmetry and each extend between an inner edge and an outer edge, the inner edges being contiguous and closer to the deflection system than the outer edges are.

According to another feature, the orientation system comprises at least one secondary longitudinal deflector at a spacing from the main longitudinal deflector.

According to another feature, the main longitudinal deflector and each secondary longitudinal deflector have outer edges and are spaced apart by a distance such that in a transverse plane, a straight line passing through the motor axis and the outer edge of the main longitudinal deflector forms an angle with a straight line passing through the motor axis and the outer edge of the secondary longitudinal deflector of between 1° and 40°.

According to another feature, the orientation system comprises secondary longitudinal deflectors which are symmetrical with respect to the main longitudinal deflector.

According to another feature, each secondary longitudinal deflector extends between upstream and downstream ends and comprises a blade which extends between the upstream and downstream ends and has inner and outer edges, the inner edge being closer to the deflection system than the outer edge is, the blade having, in planes perpendicular to the longitudinal direction, a curvature that tends to move the air streams away from the main longitudinal deflector.

According to another feature, the inner edge of each secondary longitudinal deflector forms an angle with the plane of symmetry that is greater than 0° and less than or equal to 45° and widens from the upstream end toward the downstream end.

The invention also relates to an aircraft comprising at least one propulsion unit having a nacelle according to one of the above features.

According to another feature, the aircraft comprises at least one sensor positioned in a zone, the longitudinal deflector being positioned downstream of the zone where the sensor is positioned.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 1:
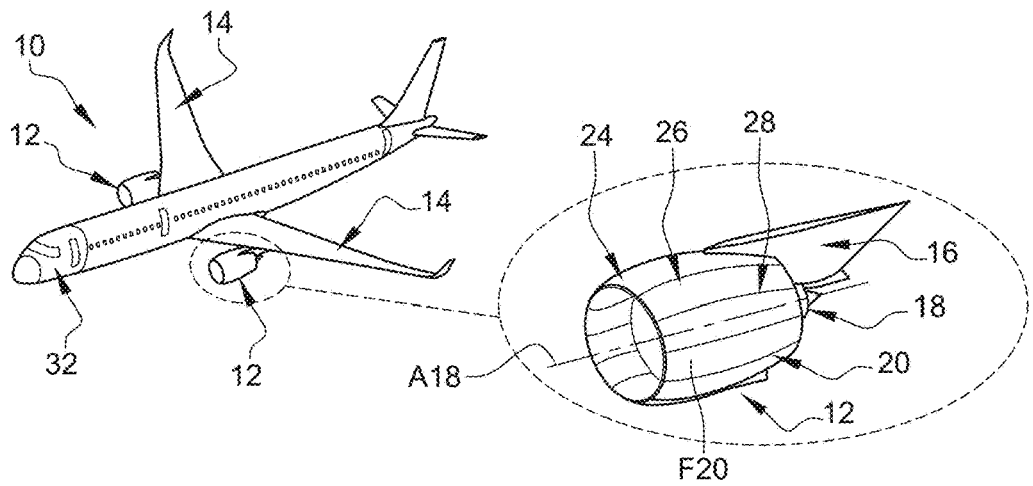
FIG. 1 is a perspective view of an aircraft and a propulsion unit, illustrating one embodiment.
Figure 2:
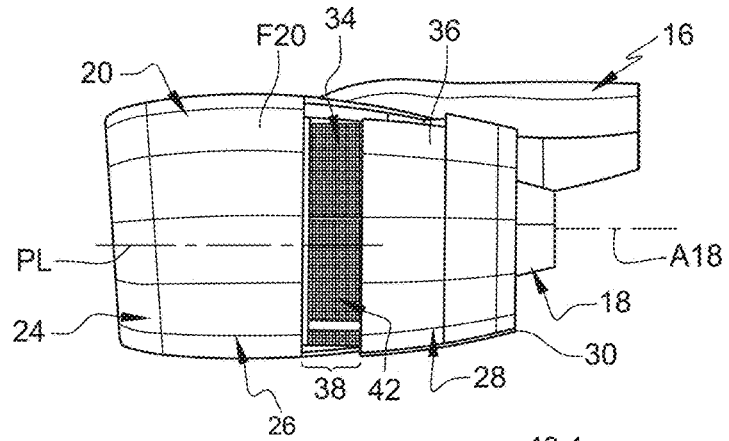
FIG. 2 is a side view of a propulsion unit, illustrating an embodiment of the prior art.
Figure 3:
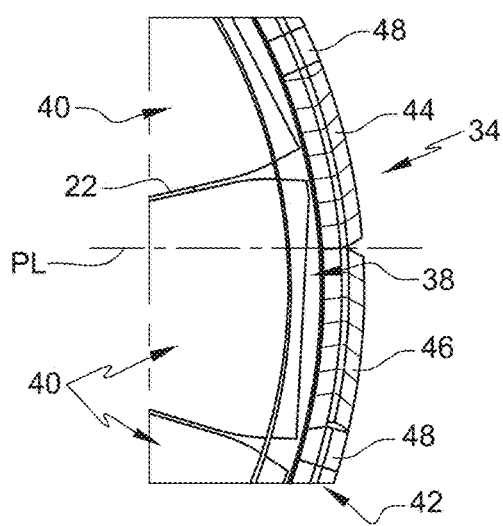
FIG. 3 is a cross section through a part of a thrust reversal device, illustrating an embodiment of the prior art.
Figure 4:
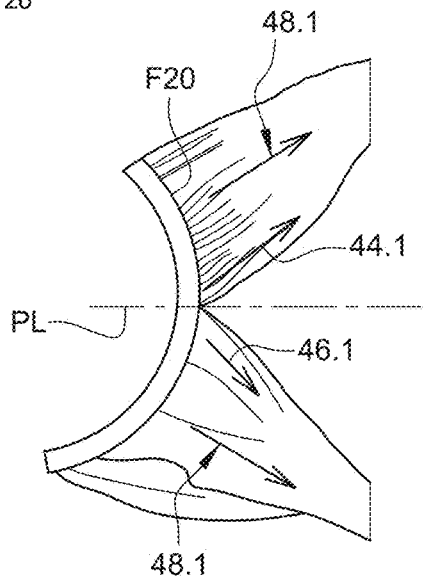
FIG. 4 is a schematic depiction of the air stream leaving the thrust reversal device shown in FIG. 3.
Figure 5:
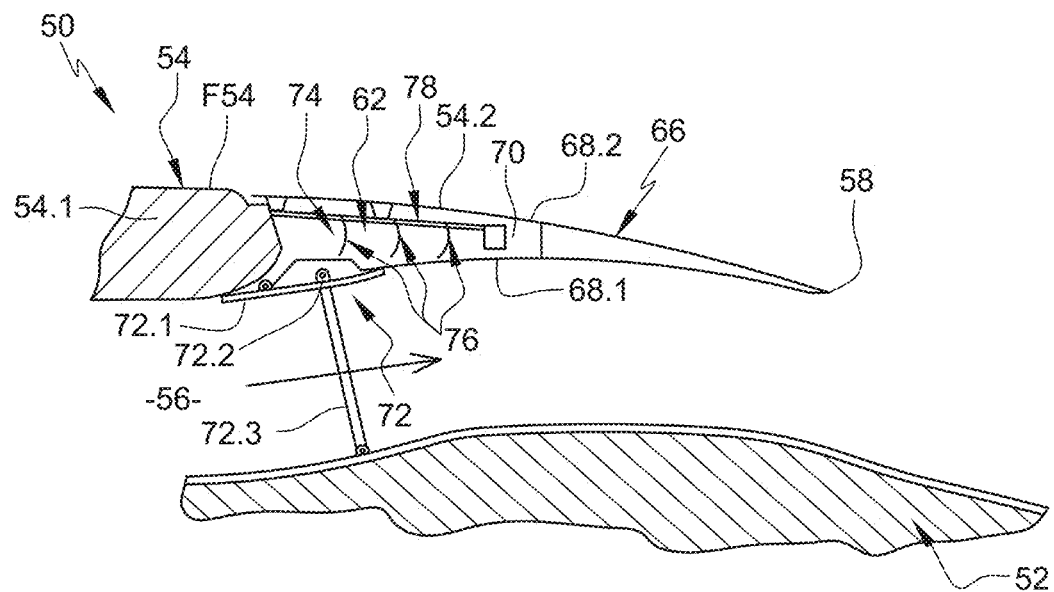
FIG. 5 is a schematic section through a propulsion unit equipped with a thrust reversal device in the inactivated state, illustrating one embodiment of the invention.
Figure 6:
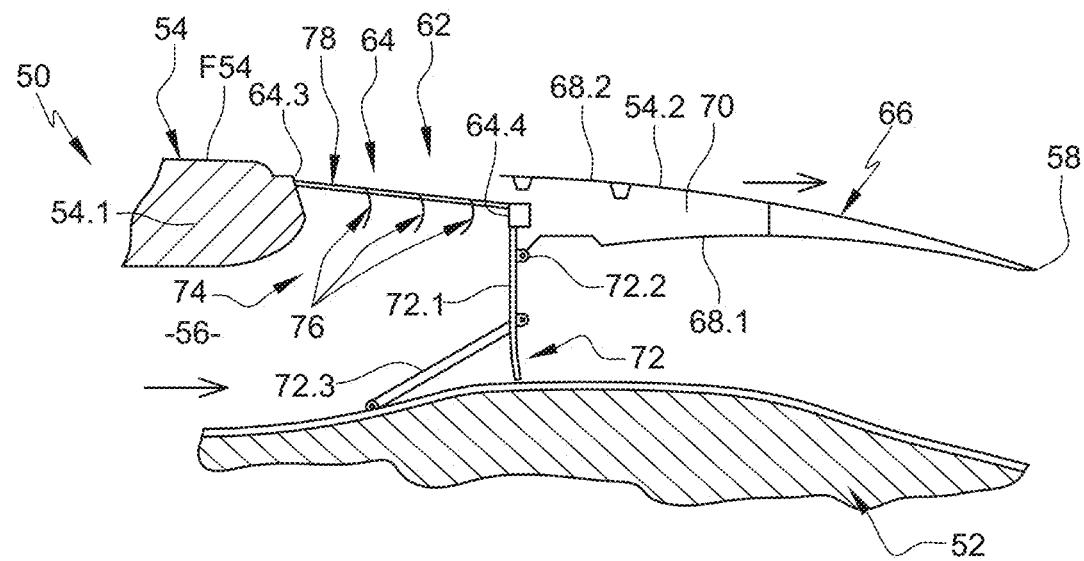
FIG. 6 is a schematic section through the propulsion unit shown in FIG. 5, the thrust reversal device being in the activated state.
Figure 7:
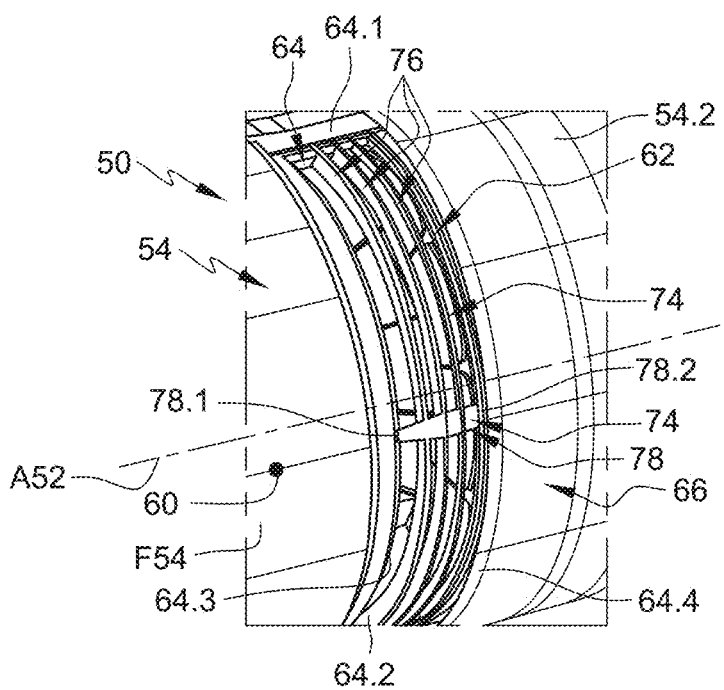
FIG. 7 is a perspective view of a part of a propulsion assembly having a thrust reversal device in the activated state, illustrating one embodiment of the invention.
Figure 8:
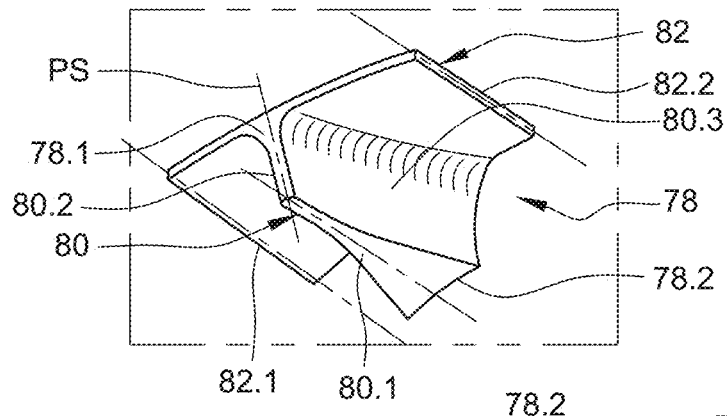
FIG. 8 is a perspective view from a first viewing angle of a main longitudinal deflector, illustrating one embodiment of the invention.
Figure 9:
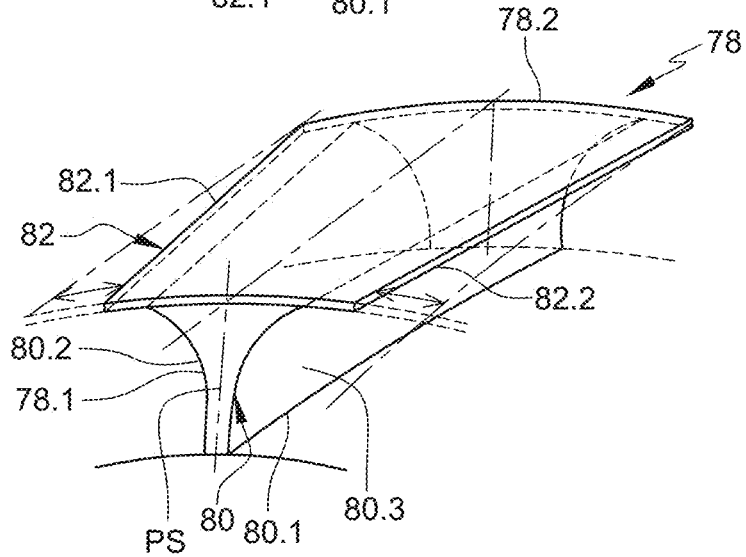
FIG. 9 is a perspective view from a second viewing angle of the main longitudinal deflector shown in FIG. 8.
Figure 10:
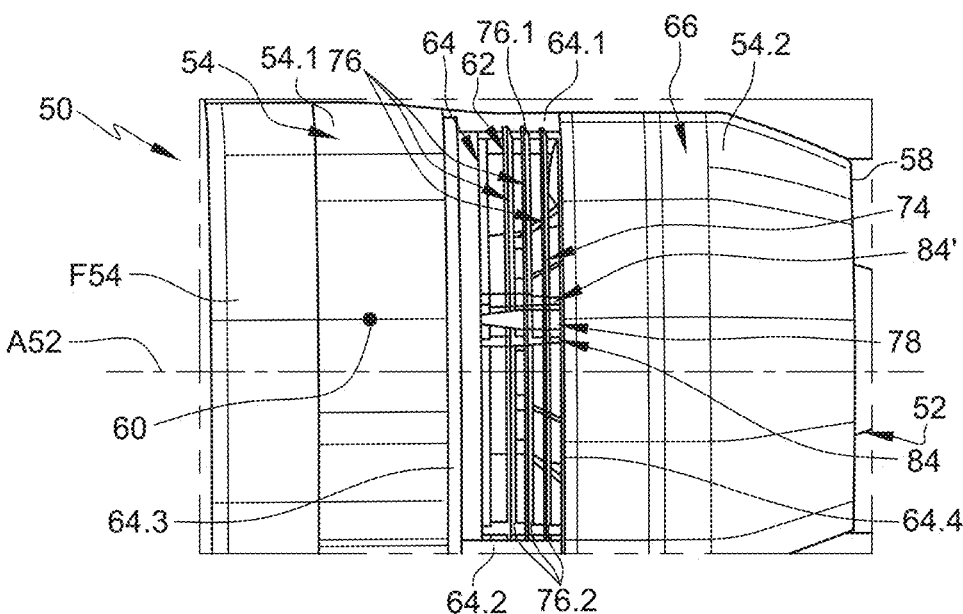
FIG. 10 is a side view of a part of a propulsion unit having a thrust reversal device in the activated state, illustrating another embodiment of the invention.
Figure 11:
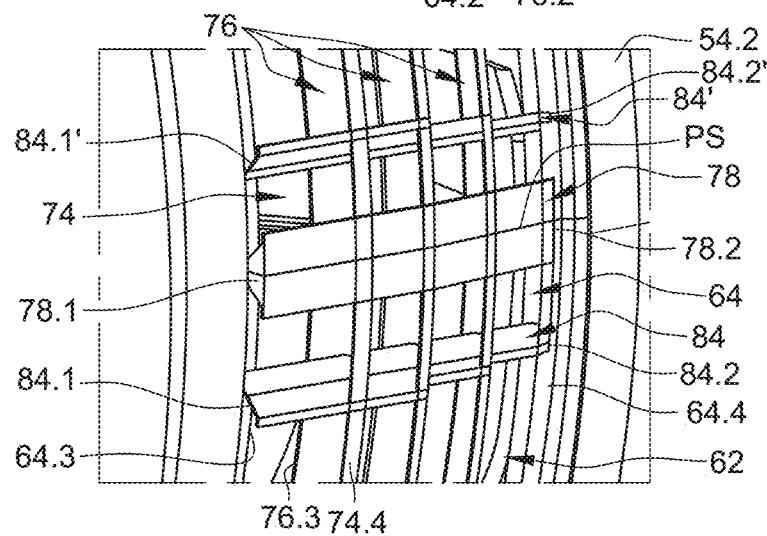
FIG. 11 is a perspective view of a part of a thrust reversal device, illustrating another embodiment of the invention.
Figure 12:
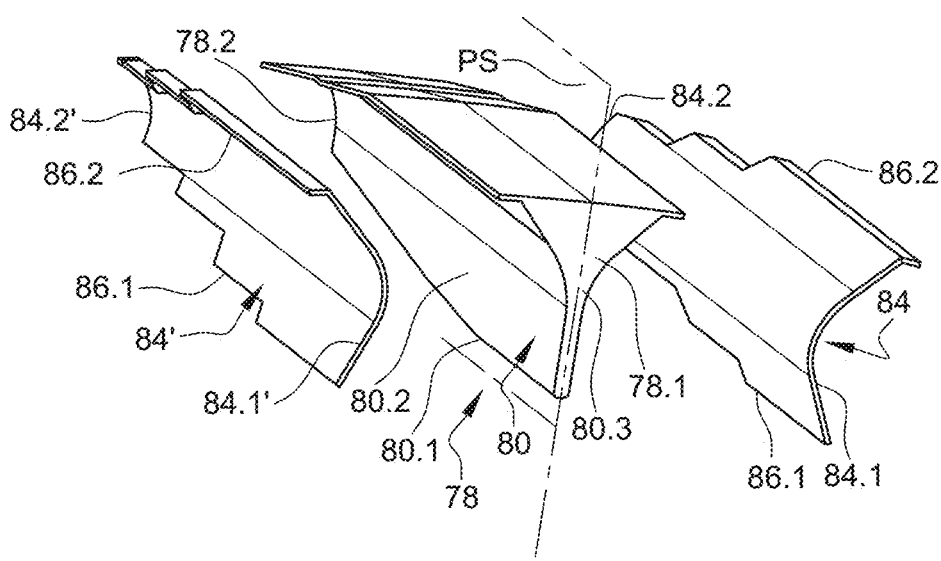
FIG. 12 is a perspective view of longitudinal deflectors, illustrating one embodiment of the invention.

According to an embodiment shown in FIGS. 5 and 6, a propulsion unit 50 comprises a motor 52 positioned inside a nacelle 54. The motor has a motor axis A52 (shown in FIGS. 7 and 10). The nacelle 54 has an approximately tubular shape and, with the motor 52, delimits an annular duct 56 in which a secondary air stream flows. The nacelle 54 comprises an upstream part 54.1 and a downstream part 54.2, which has a trailing edge 58. The nacelle 54 has an outer surface F54. In one arrangement, the nacelle 54 may comprise at least one sensor 60 positioned in a zone of the outer surface F54 of the nacelle 54, in a sensor longitudinal plane PL.

According to one application, an aircraft comprises a fuselage, a wing and at least one such propulsion unit connected to the fuselage or to the wing. Irrespective of the embodiment, the nacelle 54 is tubular and extends between upstream and downstream ends. The nacelle 54 is configured to channel an air stream in a longitudinal direction, from the upstream end to the downstream end. In one arrangement, the aircraft comprises at least one sensor 60, such as an airspeed sensor for example, positioned at the outer surface of the fuselage. Irrespective of the embodiment, the aircraft comprises at least one sensor 60 positioned in a zone.

The nacelle 54 comprises at least one thrust reversal device 62 positioned in the downstream part 54.2 and configured to occupy an activated state (shown in FIG. 6) in which it deflects, outward and toward the upstream end of the nacelle 54, at least some of the secondary air stream circulating in the annular duct 56, and an inactivated state (shown in FIG. 5) in which it does not deflect the secondary air stream circulating in the annular duct 56.

The thrust reversal device 62 comprises at least one lateral opening 64, which passes through the nacelle 54, is remote from the upstream and downstream ends of the nacelle 54, and is configured to place the annular duct 56 and the exterior of the nacelle 54, notably its outer surface F54, in communication, and at least one movable part 66 configured to occupy a first position, corresponding to the inactivated state of the thrust reversal device 62 shown in FIG. 5, in which the movable part 66 closes off the lateral opening 64, and a second position, corresponding to the activated state of the thrust reversal device 62 shown in FIG. 6, in which the movable part 66 at least partially clears the lateral opening 64.

According to one embodiment, the nacelle 54 comprises two lateral openings 64 which are substantially (i.e., +/−10%) symmetrical with respect to a vertical longitudinal plane passing through the motor axis A52. Each lateral opening 64 is delimited by upper and lower edges 64.1, 64.2 that are substantially parallel to the longitudinal direction and by upstream and downstream edges 64.3, 64.4 positioned in substantially transverse planes.

According to one configuration, the downstream part 54.2 is a movable O-shaped tubular cowl, forming the movable part 66, which moves in translation in the longitudinal direction between a closed position (shown in FIG. 5) in which the downstream part 54.2 is in contact with the upstream part 54.1, when the thrust reversal device 62 is in the inactivated state, and an open position (shown in FIG. 6) in which the downstream part 54.2 is at a spacing from the upstream part 54.1 so as to create the one (or more) lateral opening(s) 64 between the upstream and downstream parts 54.1, 54.2 when the thrust reversal device 62 is in the activated state. The downstream part 54.2 comprises an inner wall 68.1 and an outer wall 68.2 which are connected at the trailing edge 58, the inner and outer walls 68.1, 68.2 delimiting between them a cavity 70 which is open in the direction of the upstream part 54.1.

Of course, the invention is not limited to this configuration for the movable part 66.

The thrust reversal device 62 comprises at least one deflection system 72 configured to occupy a retracted position (shown in FIG. 5), when the thrust reversal device 62 is in the inactivated state, in which the deflection system 72 does not interfere with the secondary air stream channeled in the annular duct 56, and a deployed position (shown in FIG. 6), when the thrust reversal device 62 is in the activated state, in which the deflection system 72 is deployed in the annular duct 56, interferes with the secondary air stream and orients it in radial directions (which are perpendicular to the longitudinal direction) toward the lateral opening 64.

According to one embodiment, for each lateral opening 64, the deflection system 72 comprises at least one panel 72.1 and, for each panel 72.1, at least one articulation 72.2 connecting the panel 72.1 to the nacelle 54 (notably to the movable part 66) and at least one link rod 72.3 connecting the panel 72.1 to the motor 52. Of course, the invention is not limited to this embodiment for the deflection system 72.

The thrust reversal device 62 also comprises at least one orientation system 74 configured to orient at least some of the secondary air stream deflected by the deflection system 72 and leaving via the lateral opening 64. In one arrangement, the orientation system 74 is positioned at the lateral opening 64.

In one arrangement, the orientation system 74 and the cavity 70 are configured such that, in the inactivated state, the orientation system 74 is received in the cavity 70.

According to one embodiment, the orientation system 74 comprises at least one transverse deflector 76, which is positioned approximately (i.e., +/−10%) in a transverse plane and has a first end 76.1 connected to the upper edge 64.1 and a second end 76.2 connected to the lower edge 64.2. Each transverse deflector 76 has inner and outer edges 76.3, 76.4 that are curved, substantially in the shape of a circular arc, and connect the first and second ends 76.1, 76.2, the inner edge 76.3 being closer to the deflection system 72 than the outer edge 76.4 is. According to one configuration, the inner and outer edges 76.3, 76.4 have curvatures adapted to those of the inner and outer walls 68.1, 68.2 of the downstream part 54.2 of the nacelle 54 such that the orientation system 74 can be received in the cavity 70 when the thrust reversal device 62 is in the inactivated state.

Each transverse deflector 76 is configured to orient, in the radial directions and toward the upstream end, the air stream deflected by the deflection system 72 and leaving the lateral opening 64.

According to one embodiment, each transverse deflector 76 comprises a blade, in the shape of a ring portion, which has a concave curvature (the inner and outer edges 76.3, 76.4 being closer to the upstream end of the nacelle 54 than the rest of the transverse deflector 76 is) in longitudinal planes.

According to one configuration, each transverse deflector 76 has a width (distance separating the inner and outer edges 76.3, 76.4) and a curvature that are constant between its first and second ends 76.1, 76.2. As a result, the air stream leaving the nacelle 54 is substantially constant around the perimeter of the nacelle 54. In one arrangement, the transverse deflectors 76 have different widths which decrease from the upstream edge 64.3 to the downstream edge 64.4.

The number of transverse deflectors 76 and their shape are determined so as to obtain the same aerodynamic function as the cascades of the prior art, specifically a sufficient flow rate to avoid operational problems with the fan of the motor 52 and effectiveness as regards reverse thrust.

For the remainder of the description, a or the transverse deflector 76 is understood to mean at least one transverse deflector 76 and a or the air stream is understood to mean at least one air stream.

According to one feature of the invention, the orientation system 74 comprises at least one longitudinal deflector 78 positioned approximately in a longitudinal plane and configured to orient the air stream deflected by the deflection system 72 in at least one direction that forms an angle with a radial direction.

In one arrangement, the longitudinal deflector 78 is positioned downstream of a zone to be protected of the outer surface F54 of the nacelle 54 or of the fuselage of the aircraft, like the zone where the sensor 60 is positioned. Thus, the longitudinal deflector 78 is positioned in a longitudinal plane which coincides with or is close to the sensor longitudinal plane PL.

According to one embodiment, the orientation system 74 comprises a main longitudinal deflector 78 which has a T-shaped or V-shaped cross section and extends between first and second ends 78.1, 78.2. It is substantially symmetrical with respect to a longitudinal plane of symmetry PS.

According to various embodiments shown in FIGS. 7 to 14, the main longitudinal deflector 78 has a T-shaped cross section and comprises a foot 80 positioned in the longitudinal plane of symmetry PS and a head 82 positioned in a plane perpendicular to the longitudinal plane of symmetry PS, the foot 80 being closer to the deflection system 72 than the head 82 is. The foot 80 and the head 82 form a one-piece part which is made of metal or composite material and produced by any suitable means.

The head 82 takes the form of a plate which has two lateral edges 82.1, 82.2 that are substantially symmetrical with respect to the longitudinal plane of symmetry PS. According to one configuration, these lateral edges 82.1, 82.2 are substantially parallel to one another and to the longitudinal plane of symmetry PS. According to another configuration shown in FIG. 9, the lateral edges 82.1, 82.2 form between them an angle which widens from the first end 78.1 to the second end 78.2 and is between 0° and 20°. According to another configuration shown in FIG. 14, the main longitudinal deflector 78 comprises an upstream part 78A, which extends from the first end 78.1, at which the lateral edges 82.1, 82.2 form between them an angle which widens from the first end 78.1 to the second end 78.2, and a downstream part 78B, which extends from the upstream part 78A to the second end 78.2, at which the lateral edges 82.1, 82.2 are parallel.

The foot 80 has a longitudinal edge 80.1 which is remote from and substantially parallel to the head 82, and two lateral faces 80.2, 80.3 connecting the longitudinal edge 80.1 and the head 82. Each lateral face 80.2, 80.3 has a concave curvature in transverse planes.

The lateral faces 80.2, 80.3 are symmetrical with respect to the longitudinal plane of symmetry PS. According to one configuration, each lateral face 80.2, 80.3 is set apart from the longitudinal plane of symmetry PS by a constant distance between the first and second ends 78.1, 78.2. According to another configuration shown in FIG. 8, each lateral face 80.2, 80.3 is set apart from the longitudinal plane of symmetry PS by a distance which increases from the first end 78.1 to the second end 78.2. According to another configuration, the main longitudinal deflector 78 comprises an upstream part 78A, which extends from the first end 78.1, at which each lateral face 80.2, 80.3 is set apart from the longitudinal plane of symmetry PS by a distance which increases from the first end 78.1 toward the second end 78.2, and a downstream part 78B, which extends from the upstream part 78A to the second end 78.2, at which each lateral face 80.2, 80.3 is set apart from the longitudinal plane of symmetry PS by a constant distance.

In one arrangement, the longitudinal edge 80.1 of the foot 80 of the main longitudinal deflector 78 is positioned at the inner edges 76.3 of the transverse deflectors 76. The head 82 of the main longitudinal deflector 78 is positioned at the outer edges 76.4 of the transverse deflectors 76.

Figure 16:
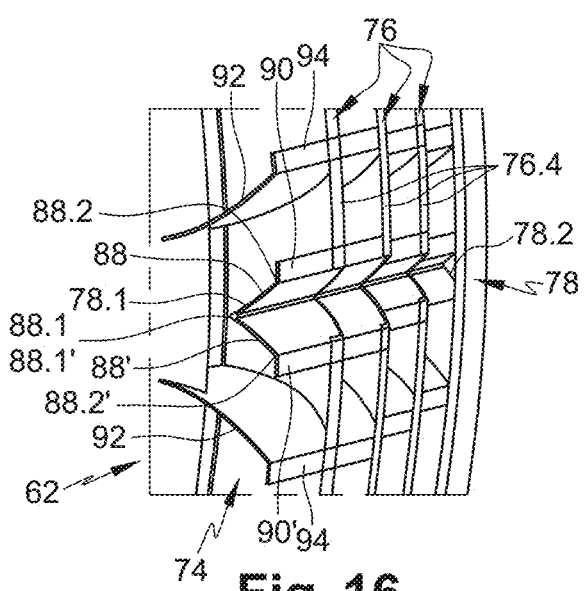
FIG. 16 is a perspective view of a part of a thrust reversal device, illustrating another embodiment of the invention.
Figure 17:
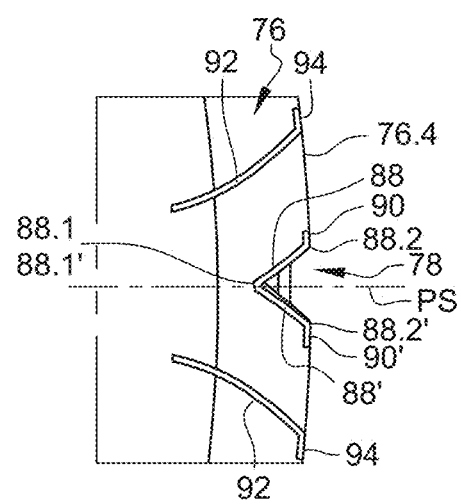
FIG. 17 is a cross section through the thrust reversal device shown in FIG. 16.
Figure 18:
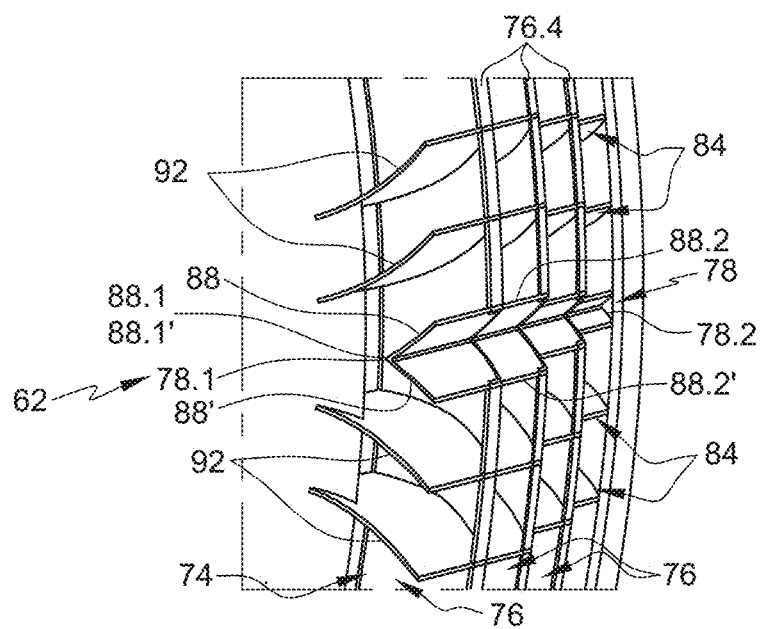
FIG. 18 is a perspective view of a part of a thrust reversal device, illustrating another embodiment of the invention.

According to embodiments shown in FIGS. 16 to 18, the main longitudinal deflector 78 has a V-shaped cross section and comprises two wings 88, 88' which are substantially symmetrical with respect to the plane of symmetry PS and each extend between an inner edge 88.1, 88.1' and an outer edge 88.2, 88.2', the inner edges 88.1, 88.1' being contiguous and closer to the deflection system 72 than the outer edges 88.2, 88.2' are, which are at a spacing. According to an embodiment shown in FIGS. 16 and 17, each wing 88, 88' is continued at its outer edge 88.2, 88.2' by a blade 90, 90' positioned in a curved surface containing the outer edges 76.4 of the transverse deflectors 76. According to an embodiment shown in FIG. 18, the main longitudinal deflector 78 does not comprise a blade.

According to the embodiments shown in FIGS. 16 to 18, the wings 88, 88' are not necessarily flat. They may be slightly curved between the inner and outer edges. The wings 88, 88' may form a constant angle between the first and second ends 78.1, 78.2 of the main longitudinal deflector 78. In a variant, the angle formed by the wings 88, 88' may increase gradually between the first and second ends 78.1, 78.2 or increase gradually at an upstream part of the main longitudinal deflector 78 and remain constant at a downstream part.

According to one configuration, the main longitudinal deflector 78 intersects the transverse deflector 76. In one arrangement, the first and second ends 78.1, 78.2 are connected to the upstream and downstream ends 64.3, 64.4 delimiting the lateral opening 64 and/or the main longitudinal deflector 78 is connected to the transverse deflector 76.

According to the embodiments shown in FIGS. 10 to 14, the orientation system 74 comprises, in addition to the main longitudinal deflector 78, at least one secondary longitudinal deflector 84 at a spacing from the main longitudinal deflector 78.

According to one configuration, the orientation system 74 comprises two secondary longitudinal deflectors 84, 84' which are symmetrical with respect to the main longitudinal deflector 78, more particularly with respect to its longitudinal plane of symmetry PS, one secondary longitudinal deflector 84, 84' being on either side of the main longitudinal deflector 78. According to another configuration shown in FIG. 18, the orientation system 74 comprises four secondary longitudinal deflectors 84, 84' which are symmetrical with respect to the main longitudinal deflector 78, two secondary longitudinal deflectors 84, 84' being on either side of the main longitudinal deflector 78. Each secondary longitudinal deflector 84, 84' extends between upstream and downstream ends 84.1/84.1', 84.2/84.2'. Each secondary longitudinal deflector 84, 84' intersects the transverse deflector 76. In one arrangement, the upstream and downstream ends 84.1/84.1', 84.2/84.2' are connected to the upstream and downstream edges 64.3, 64.4 delimiting the lateral opening 64 and/or each secondary longitudinal deflector 84, 84' is connected to the transverse deflector 76.

According to one embodiment, each secondary longitudinal deflector 84, 84' comprises a blade which extends between the upstream and downstream ends 84.1/84.1', 84.2/84.2' and has inner and outer edges 86.1, 86.2, the inner edge 86.1 being closer to the deflection system 72 than the outer edge 86.2 is. Each blade has, in transverse planes, a concave curvature (the blade being located between the center of the curvature and the main longitudinal deflector 78), which tends to move the air stream away from the main longitudinal deflector 78 and is constant between the upstream and downstream ends 84.1/84.1', 84.2/84.2'. In one arrangement, the inner edge 86.1 of each secondary longitudinal deflector 84, 84' is located at the inner edges 76.3 of the transverse deflectors 76 and/or the outer edge 86.1 of each secondary longitudinal deflector 84, 84' is located at the outer edges 76.4 of the transverse deflectors 76. According to another embodiment shown in FIGS. 16 and 17, each secondary longitudinal deflector 84, 84' comprises a main blade 92, as described above, and a secondary blade 94 which continues the main blade 92 and is positioned in a curved surface containing the outer edges 76.4 of the transverse deflectors 76.

Figure 13:
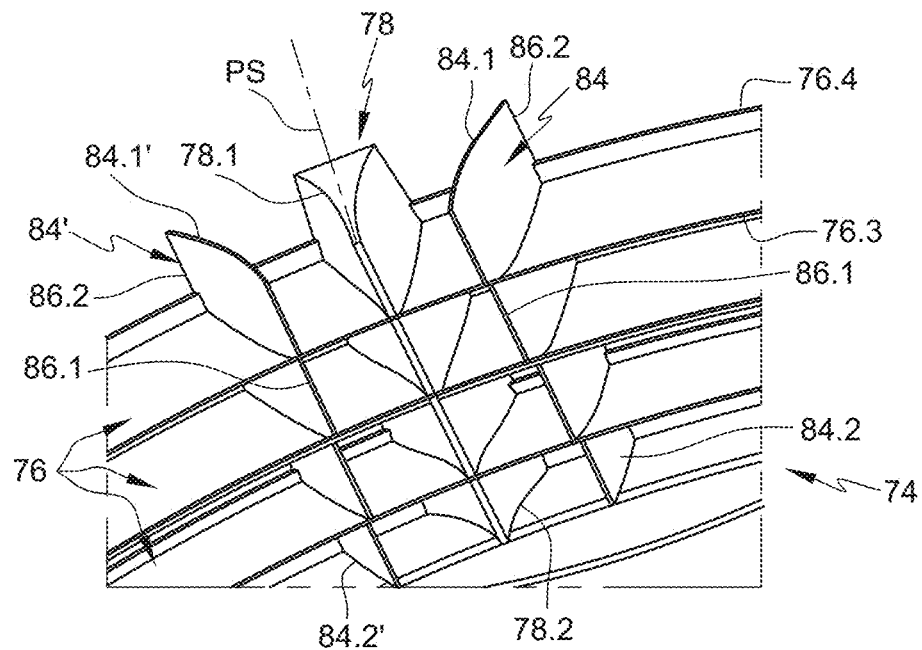
FIG. 13 is a perspective view of a part of a thrust reversal device, illustrating another embodiment of the invention.
Figure 14:
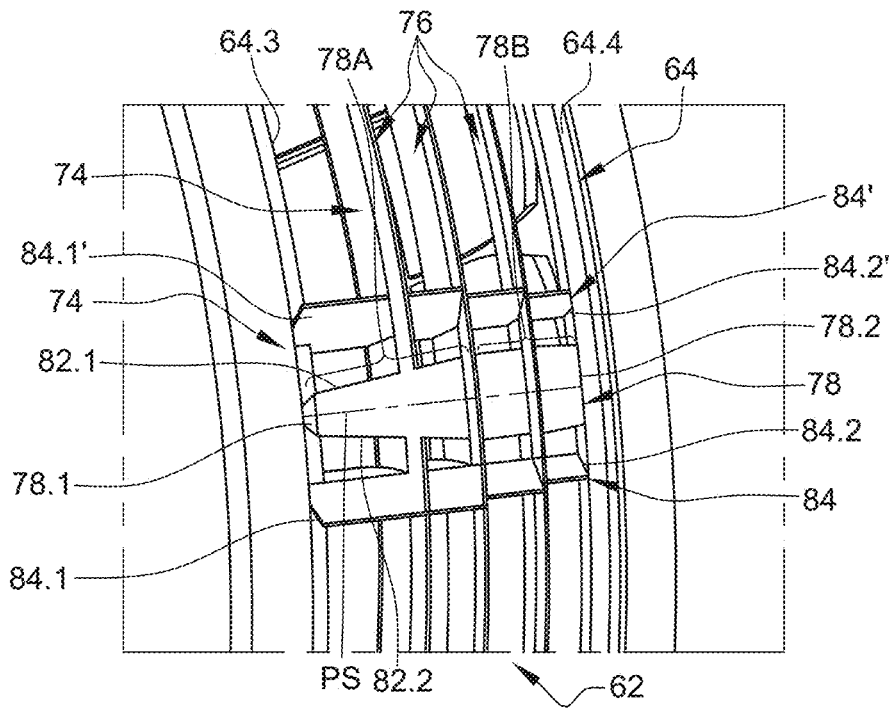
FIG. 14 is a perspective view of a part of a thrust reversal device, illustrating another embodiment of the invention.

According to a configuration shown in FIG. 13, each secondary longitudinal deflector 84, 84' has a height (distance between the inner and outer edges 86.1, 86.2) which is constant between the upstream and downstream ends 84.1/84.1', 84.2/84.2'. According to another configuration shown in FIGS. 11 and 12, each secondary longitudinal deflector 84, 84' has a height which evenly or progressively decreases from the upstream end 84.1/84.1' to the downstream end 84.2/84.2'.

According to a configuration shown in FIG. 13, the inner edge 86.1 of each secondary longitudinal deflector 84, 84' is parallel to the longitudinal plane of symmetry PS. According to another configuration shown in FIG. 14, the inner edge 86.1 of each secondary longitudinal deflector 84, 84' forms an angle α with the longitudinal plane of symmetry PS that is greater than 0° and less than or equal to 45° and widens from the upstream end 84.1/84.1' toward the downstream end 84.2/84.2'.

Figure 15:
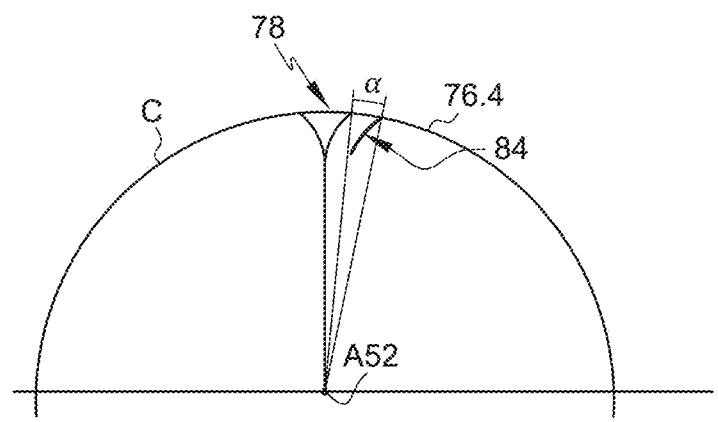
FIG. 15 is a schematic cross section through a part of a thrust reversal device, illustrating one embodiment of the invention.

As illustrated in FIG. 15, the main longitudinal deflector 78 has an outer edge (the lateral edges 82.1, 82.2 or the outer edges 88.2, 88.2') positioned at a curved surface C (corresponding to the curved surface containing the outer edges 76.4 of the transverse deflectors 76). In parallel, each secondary longitudinal deflector 84, 84' has an outer edge 86.2 positioned approximately at the curved surface C. Each secondary longitudinal deflector 84, 84' is at a spacing from the main longitudinal deflector 78 (or from another secondary longitudinal deflector) by a distance such that in a transverse plane, a straight line passing through the motor axis A52 and the outer edge of the main longitudinal deflector 78 (the one closest to the secondary longitudinal deflector 84) forms an angle with a straight line passing through the motor axis A52 and the outer edge of the secondary longitudinal deflector 84 (the one closest to the main deflector 78) of between 1° and 40°.

Irrespective of the embodiment, the orientation system 74 comprises at least one longitudinal deflector 78 configured to orient the air stream deflected by the deflection system 72 in at least one direction that forms an angle with a radial direction. As a result, even though the transverse deflectors 76 orient the air stream deflected by the deflection system 72 substantially constantly around the perimeter of the nacelle 54, each longitudinal deflector 78 makes it possible to orient the air stream deflected by the deflection system 72 such that it does not impact a sensitive zone of the outer surface F54 of the nacelle 54, like that where a sensor 60 is positioned.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
   an outer surface, extending between an upstream end and a downstream end, configured to channel an air stream flowing in a longitudinal direction from the upstream end to the downstream end, and
   at least one thrust reversal device which comprises:
   at least one lateral opening which is remote from the upstream end and the downstream end, passes through the aircraft nacelle and is delimited by an upper edge and a lower edge,
   at least one movable part configured to occupy a first position, corresponding to an inactivated state of the at least one thrust reversal device, in which the at least one movable part shuts off the at least one lateral opening, and a second position, corresponding to an activated state of the at least one thrust reversal device, in which the at least one movable part at least partially clears the at least one lateral opening,
   at least one deflection system configured to occupy a first position, when the at least one thrust reversal device is in the inactivated state, in which the at least one deflection system does not interfere with the air stream channeled in the aircraft nacelle, and a second position, when the at least one thrust reversal device is in the activated state, in which the at least one deflection system interferes with the air stream channeled in the aircraft nacelle and orients the at least one deflection system in radial directions toward the at least one lateral opening, and, at least one orientation system configured to orient the air stream deflected by the at least one deflection system, wherein the at least one orientation system comprises:

at least one transverse deflector positioned approximately in a plane perpendicular to the longitudinal direction, having a first end connected to the upper edge of the at least one lateral opening and a second end connected to the lower edge of the at least one lateral opening and configured to orient the air stream deflected by the at least one deflection system in the radial directions and toward the upstream end of the aircraft nacelle, at least one longitudinal deflector positioned approximately in a plane parallel to the longitudinal direction and configured to orient the air stream deflected by the at least one deflection system in at least one direction that forms an angle with one of the radial directions, and a main longitudinal deflector which has a V-shaped cross section and extends between a first end and a second end of the main longitudinal deflector, the main longitudinal deflector being substantially symmetrical with respect to a longitudinal plane of symmetry;

wherein the main longitudinal deflector comprises two wings which are substantially symmetrical with respect to the longitudinal plane of symmetry and each extend between an inner edge and an outer edge, the inner edge being contiguous and closer to the at least one deflection system than the outer edge.

2. The aircraft nacelle as claimed in claim 1, wherein the at least one longitudinal deflector intersects the at least one transverse deflector.

3. The aircraft nacelle as claimed in claim 1, wherein the at least one orientation system comprises at least one secondary longitudinal deflector at a spacing from the main longitudinal deflector.

4. The aircraft nacelle as claimed in claim 3, wherein each of the at least one secondary longitudinal deflector has an outer edge, and the aircraft nacelle further comprising:

a motor axis and wherein the main longitudinal deflector and each of the at least one secondary longitudinal deflector are spaced apart by a distance such that in a transverse plane, a straight line passing through the motor axis and the outer edge of the main longitudinal deflector forms an angle with a straight line passing through the motor axis and the outer edge of the at least one secondary longitudinal deflector of between 1° and 40°.

5. The aircraft nacelle as claimed in claim 3, wherein each of the at least one secondary longitudinal deflector extends between the upstream end and the downstream end and comprises a blade which extends between the upstream end and the downstream end and has an inner edge and an outer edge, the inner edge being closer to the at least one deflection system than the outer edge, the blade having, in planes perpendicular to the longitudinal direction, a curvature configured to move the air stream away from the main longitudinal deflector.

6. The aircraft nacelle as claimed in claim 5, wherein the inner edge of each of the at least one secondary longitudinal deflector forms an angle with the plane of symmetry that is greater than 0° and less than or equal to 45°.

7. The aircraft nacelle as claimed in claim 1, wherein the at least one orientation system comprises secondary longitudinal deflectors which are symmetrical with respect to the main longitudinal deflector.

8. An aircraft comprising:

at least one propulsion unit comprising the aircraft nacelle as claimed in claim 1, and at least one sensor positioned in a zone, wherein the at least one longitudinal deflector is positioned downstream of the zone where the at least one sensor is positioned.

* * * * *